United States Patent
Harris et al.

(10) Patent No.: US 10,577,961 B2
(45) Date of Patent: Mar. 3, 2020

(54) TURBINE DISK WITH BLADE SUPPORTED PLATFORMS

(71) Applicants: Rolls-Royce High Temperature Composites Inc., Cypress, CA (US); Rolls-Royce Corporation, Indianapolis, IN (US); Rolls-Royce North American Technologies Inc., Indianapolis, IN (US); Rolls-Royce plc, London (GB)

(72) Inventors: Stephen Harris, Long Beach, CA (US); Aaron D. Sippel, Zionsville, IN (US); Ted J. Freeman, Danville, IN (US); Anthony Razzell, Derby (GB)

(73) Assignees: Rolls-Royce High Temperature Composites Inc., Cypress, CA (US); Rolls-Royce plc (GB); Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 50 days.

(21) Appl. No.: 15/959,906

(22) Filed: Apr. 23, 2018

(65) Prior Publication Data
US 2019/0323371 A1  Oct. 24, 2019

(51) Int. Cl.
*F01D 5/28* (2006.01)
*F01D 5/22* (2006.01)
*F01D 11/00* (2006.01)

(52) U.S. Cl.
CPC ............ *F01D 11/008* (2013.01); *F01D 5/225* (2013.01); *F01D 5/282* (2013.01); *F05D 2220/32* (2013.01); *F05D 2240/24* (2013.01); *F05D 2240/55* (2013.01); *F05D 2240/80* (2013.01); *F05D 2300/6033* (2013.01)

(58) Field of Classification Search
CPC ........ F01D 5/30; F01D 11/008; F01D 5/3069; F01D 5/22; F05D 2240/80
See application file for complete search history.

(56) References Cited

U.S. PATENT DOCUMENTS

| | | |
|---|---|---|
| 3,784,320 A | 1/1974 | Rossmann et al. |
| 4,019,832 A | 4/1977 | Salemme et al. |
| 4,169,694 A | 10/1979 | Sanday |
| 4,471,008 A | 9/1984 | Huther |
| 4,650,399 A * | 3/1987 | Craig ..................... B23P 15/04 416/193 A |
| 4,743,166 A | 5/1988 | Elston, III et al. |
| 4,802,824 A | 2/1989 | Gastebois et al. |
| 5,160,243 A | 11/1992 | Herzner et al. |
| 5,240,375 A | 8/1993 | Wayte |
| 5,275,536 A | 1/1994 | Stephens et al. |
| 5,277,548 A | 1/1994 | Klein et al. |
| 5,791,877 A | 8/1998 | Stenneler |
| 6,132,175 A | 10/2000 | Cai et al. |
| 6,290,466 B1 | 9/2001 | Ravenhall et al. |
| 6,375,429 B1 | 4/2002 | Halila et al. |
| 6,398,499 B1 | 6/2002 | Simonetti et al. |

(Continued)

*Primary Examiner* — Richard A Edgar
(74) *Attorney, Agent, or Firm* — Barnes & Thornburg LLP

(57) ABSTRACT

A turbine wheel for use in a gas turbine engine having a plurality of blades attached to a rotor disk. The blades each fit within slots formed in the rotor disk to couple the blades to the rotor disk. Platform segments are arranged about each of the blades.

10 Claims, 5 Drawing Sheets

(56) References Cited

U.S. PATENT DOCUMENTS

| | | |
|---|---|---|
| 6,547,526 B2 | 4/2003 | Van Daam et al. |
| 6,619,924 B2 | 9/2003 | Miller |
| 6,632,070 B1 | 10/2003 | Tiemann |
| 6,652,228 B2 | 11/2003 | Tiemann |
| 6,860,722 B2 | 3/2005 | Forrester et al. |
| 7,094,021 B2 | 8/2006 | Haubert |
| 7,326,035 B2 | 2/2008 | Rodrigues et al. |
| 7,874,804 B1 | 1/2011 | Brown |
| 7,878,763 B2 | 2/2011 | Keith et al. |
| 7,931,442 B1 | 4/2011 | Liang |
| 7,972,113 B1 | 7/2011 | Davies |
| 8,016,565 B2 | 9/2011 | Berg et al. |
| 8,408,874 B2 | 4/2013 | McCaffrey et al. |
| 8,435,007 B2 * | 5/2013 | Morrison ................ F23M 5/04 416/193 A |
| 8,529,208 B2 * | 9/2013 | Brault ...................... F01D 5/22 416/191 |
| 8,951,015 B2 | 2/2015 | Brandl et al. |
| 9,239,062 B2 | 1/2016 | Lamboy et al. |
| 9,482,108 B2 * | 11/2016 | Garcia Crespo ........ F01D 5/081 |
| 9,745,856 B2 | 8/2017 | Uskert et al. |
| 2007/0020102 A1 | 1/2007 | Beeck et al. |
| 2007/0048142 A1 | 3/2007 | Dambrine et al. |
| 2009/0016890 A1 | 1/2009 | Douguet et al. |
| 2009/0060745 A1 | 3/2009 | Douguet et al. |
| 2012/0082551 A1 | 4/2012 | Macchia et al. |
| 2016/0305260 A1 * | 10/2016 | Freeman ............... F01D 5/3007 |

* cited by examiner

TURBINE DISK WITH BLADE SUPPORTED PLATFORMS

FIELD OF THE DISCLOSURE

The present disclosure relates generally to gas turbine engines, and more specifically to composite blade attachment.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The turbine may include turbine wheels having disks and a plurality of blades that extend radially away from the disks. To withstand heat from the combustion products received from the combustor, the blades may be made from ceramic matrix composite materials that are able to interact with the hot combustion gasses. In some turbine wheels, the disk is made from metallic materials and supports the blades in a gas path leading out of the combustor. Platforms may be arranged around airfoils included in the blades to resist radial inward movement of the hot gasses toward the metallic disk. Forming blades made with ceramic matrix composite materials to have conventional platform geometry may present design challenges.

SUMMARY

The present disclosure may comprise one or more of the following features and combinations thereof.

A turbine wheel may include a disk and a plurality of turbine blades. The disk may comprise metallic material and is arranged around a central axis. The disk is formed to include slots that extend radially inward from an outer diameter of the disk toward the central axis. The plurality of turbine blades may comprise ceramic matrix composite materials. Each of the plurality of turbine blades is coupled to the disk and extends radially away from the outer diameter of the disk. The plurality of turbine blades include a first turbine blade shaped to provide an airfoil configured to interact with hot gasses passing around the plurality of turbine blades, a root received in one of the slots formed in the disk to couple the first turbine blade to the disk, and a platform that extends circumferentially in a single direction from the airfoil to discourage the hot gasses interacting with the airfoil from moving radially inward toward the disk.

In some embodiments, the first turbine blade further includes a retainer shoulder that extends circumferentially in a single direction opposite the platform from the airfoil. The retainer shoulder may have a circumferential length that is less than a circumferential length of the platform.

In some embodiments, the plurality of turbine blades includes a second turbine blade shaped to provide an airfoil, a root, and a platform that extends circumferentially in a single direction from the airfoil. The retainer shoulder included in the first turbine blade may be configured to interlock with the platform included in the second turbine blade to block radial movement of the platform of the second turbine blade.

In some embodiments, the platform included in the first turbine blade includes a partition member and a radially-inner lip. The radially-inner lip may extend circumferentially away from the partition member and toward the second turbine blade.

In some embodiments, the second turbine blade includes a retainer shoulder. The retainer shoulder included in the second turbine blade may be aligned circumferentially with the radially-inner lip included in the platform of the first turbine blade. The retainer shoulder included in the second turbine blade may be spaced apart from the disk to locate the radially-inner lip included in the platform of the first turbine blade therebetween.

In some embodiments, the circumferential length of the platform is at least twice as long as the circumferential length of the retainer shoulder.

In some embodiments, the plurality of turbine blades includes a second turbine blade shaped to provide an airfoil, a root, a platform, and a retainer shoulder. The platform of the first turbine blade may extend circumferentially to the root of the second turbine blade.

In some embodiments, the plurality of turbine blades includes a second turbine blade shaped to provide an airfoil, a root, a platform, and a retainer shoulder. A radial outer surface of the retainer shoulder included in the second turbine blade and a radial outer surface of the platform included in the first turbine blade may be coradial.

According to another aspect of the present disclosure, a turbine wheel may include a disk, a first turbine blade, a second turbine blade, and a platform. The disk may comprise metallic material and is arranged around a central axis. The disk is formed to include slots that extend radially inward from an outer diameter of the disk toward the central axis.

The first turbine blade may comprise ceramic matrix composite material. The first turbine blade includes a root received in one of the slots formed in the disk to couple the first turbine blade to the disk, an airfoil that extends radially outward away from the root of the first turbine blade, and a retainer shoulder that extends around the airfoil of the first turbine blade and includes a surface that faces radially inward toward the root of the first turbine blade.

The second turbine blade may comprise ceramic matrix composite material. The second turbine blade includes a root received in one of the slots formed in the disk to couple the second turbine blade to the disk, an airfoil that extends radially outward away from the root of the second turbine blade, and a retainer shoulder that extends around the airfoil of the second turbine blade. The retainer shoulder includes a surface that faces radially inward toward the root of the second turbine blade.

The platform is independent of the first turbine blade and the second turbine blade. The platform extends circumferentially between the first turbine blade and the second turbine blade to form a portion of a gas path around the first turbine blade and the second turbine blade. The retainer shoulder of the first turbine blade and the retainer shoulder of the second turbine blade may cooperate to block radial movement of the platform.

In some embodiments, the platform may include a partition member and a radially-inner lip. The radially-inner lip may extend circumferentially away from the partition member toward the first turbine blade.

In some embodiments, the retainer shoulder of the first turbine blade extends away from the airfoil of the first turbine blade and toward the second turbine blade. The retainer shoulder of the first turbine blade may include an outer surface. The platform may include an outer surface that is coradial with the outer surface of the retainer shoulder of the first turbine blade.

In some embodiments, the platform includes a radially-outer lip that extends circumferentially away from the partition member toward the first turbine blade. The radially-inner lip may extend circumferentially further than the radially-outer lip.

In some embodiments, an entire outer surface of the retainer shoulder included in the first turbine blade forms a portion of the gas path. In some embodiments, the retainer shoulder may be bounded by a footprint of the airfoil when viewing the first turbine blade radially inward toward the central axis.

According to another aspect of the present disclosure, a turbine wheel may include a disk, a plurality of turbine blades, and a first platform segment. The disk may comprise metallic material and is arranged around a central axis. The disk is formed to include slots that extend radially inward from an outer diameter of the disk toward the central axis.

The plurality of turbine blades may comprise ceramic matrix composite materials. The plurality of turbine blades is coupled to the disk and extends radially away from the outer diameter. The plurality of turbine blades include a first turbine blade shaped to provide an airfoil configured to interact with hot gasses passing around the plurality of turbine blades, a root received in one of the slots formed in the disk to couple the first turbine blade to the disk, and a first retainer shoulder that extends axially from the airfoil.

The first platform segment is independent of the first turbine blade. The first platform segment may interlock with the first retainer shoulder and is arranged to extend around a portion of the first turbine blade to discourage the hot gasses interacting with the airfoil from moving radially inward toward the disk.

In some embodiments, the first platform segment includes a partition member, a radially-inner lip that extends axially away from the partition member, and a radially-outer lip that extends axially away from the partition member. The first retainer shoulder may be located radially between the radially-outer lip and the radially-inner lip.

In some embodiments, the turbine wheel further includes an annular, full-hoop retention band. The annular, full-hoop retention band may be spaced apart axially from the first turbine blade to locate the first platform segment and the disk axially between the annular, full-hoop retention band and the first turbine blade to block axial movement of the first platform segment.

In some embodiments, the turbine wheel may further include a second platform segment that is independent of the first turbine blade. The second platform segment may extend around a portion of the first turbine blade so that the first platform segment and the second platform segment cooperate to extend entirely around the airfoil of the first turbine blade. The first platform segment may extend around a pressure side and a suction side of each of the plurality of turbine blades. The second platform segment may extend around the pressure side and the suction side of each of the plurality of turbine blades.

In some embodiments, the first platform segment extends around a pressure side and a suction side of each of the plurality of turbine blades. In some embodiments, the first platform segment may be formed as a continuous, full hoop that extends around the central axis.

These and other features of the present disclosure will become more apparent from the following description of the illustrative embodiments.

DETAILED DESCRIPTION OF THE DRAWINGS

Figure 1:
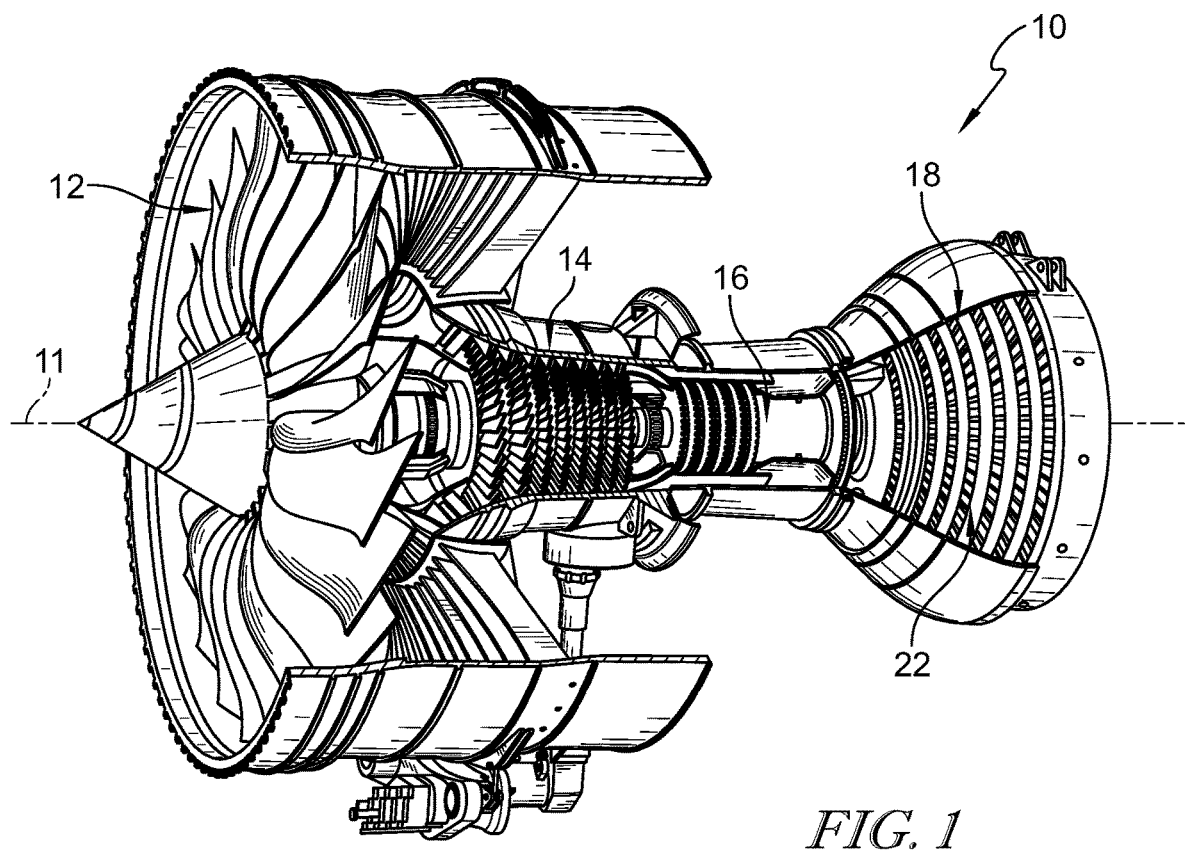
FIG. 1 is cutaway view of a gas turbine engine that includes a fan, a compressor, a combustor, and a turbine and the turbine includes a plurality of turbine wheels in accordance with the present disclosure and shown with further details in FIGS. 2 and 3.

For the purposes of promoting an understanding of the principles of the disclosure, reference will now be made to a number of illustrative embodiments illustrated in the drawings and specific language will be used to describe the same.

Figure 2:
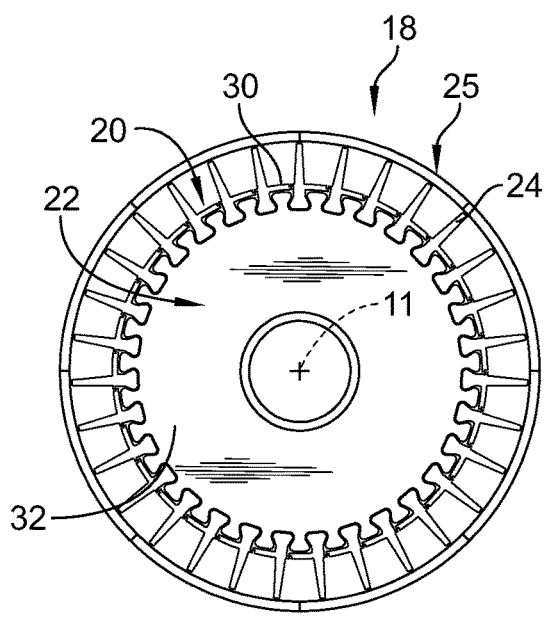
FIG. 2 is an elevation view of the turbine of the gas turbine engine of FIG. 1 showing one of the turbine wheels and a shroud arranged around the turbine wheel.
Figure 3:
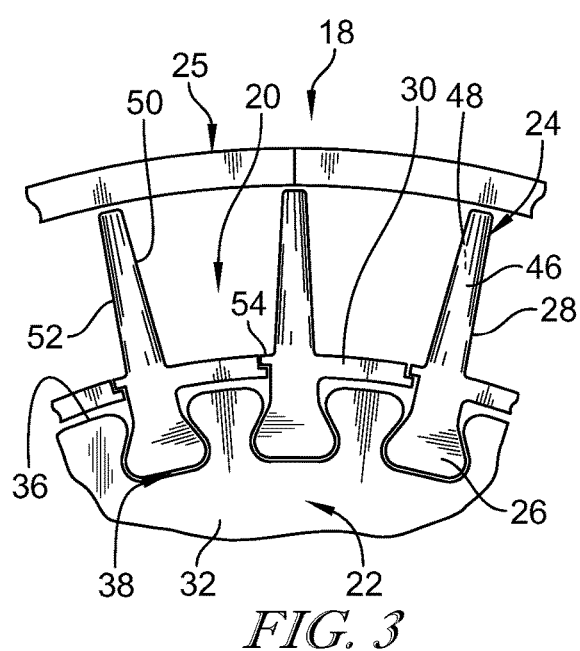
FIG. 3 is an enlarged view of a portion of the turbine of FIG. 2 showing that the turbine wheel includes a disk and a plurality of blades that are coupled with the disk, each blade includes an elongated platform that extends toward a neighboring blade and is blocked from moving radially outward by a retainer shoulder included in the neighboring blade.

A turbine wheel 20 in accordance with the present disclosure is shown in FIGS. 2 and 3 and is adapted for use in an illustrative gas turbine 10 as suggested in FIG. 1. As show in FIGS. 2 and 3, the turbine wheel 20 includes a disk 22 and a plurality of turbine blades 24 that extend radially outward away from the disk 22.

Figure 4:
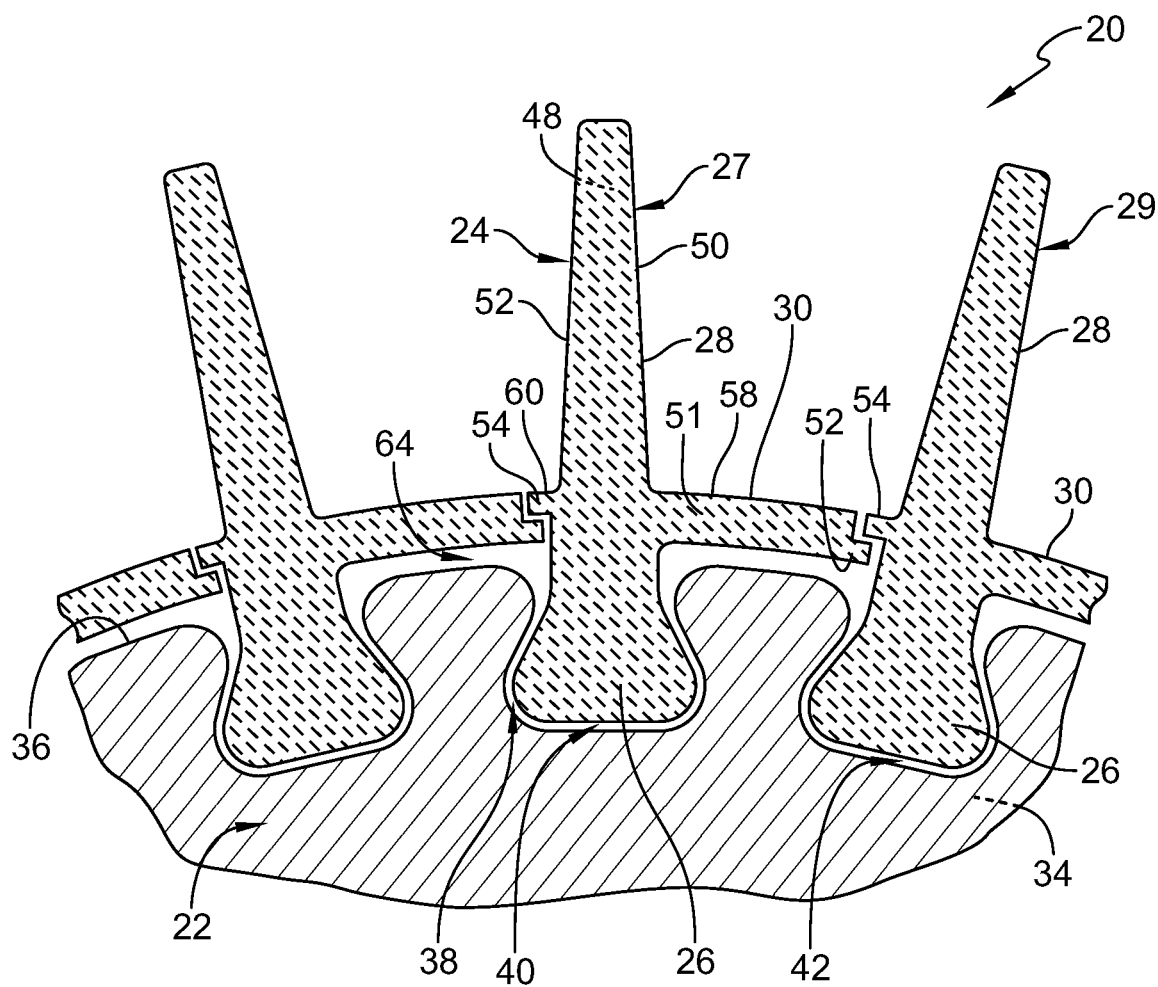
FIG. 4 is a section view of the turbine wheel of FIG. 3 showing the plurality of blades coupled with the disk and further showing the elongated platforms that extend from one blade to the neighboring blade and the retainer shoulder that blocks radial movement of a platform of a neighboring blade.

Each turbine blade 24 includes a root 26, an airfoil 28 that extends outwardly away from the root 26, a platform 30, and a retainer shoulder 54 as shown in FIG. 4. The airfoil 28 is configured to interact with hot gasses passing around the plurality of turbine blades 24 to rotate the disk 22 during operation of the gas turbine engine 10. The platform 30 is integrally formed with the airfoil 28 and the root 26 and extends circumferentially in a single direction from the airfoil 28 toward a neighboring turbine blade 24. The platform 30 resists radially inward movement of the hot gasses that interact with the airfoil to insulate the disk 22 from the hot gasses. The retainer shoulder 54 is configured to block radial movement of a platform of an adjacent turbine blade.

In other embodiments, turbine wheels adapted for use in the gas turbine engine 10 include a disk, a plurality of turbine blades that extend radially outward away from the disk, and a plurality of platforms arranged around the plurality of turbine blades as shown in FIGS. 6-10 and discussed in greater detail below. The platforms may be distinct and independent of the turbine blades to ease manufacturing requirements of the turbine blades and potentially increase the life of the turbine blades, for example. The platforms are arranged around at least a portion of one or more of the turbine blades to discourage the hot gasses that interact with the airfoils of the turbine blades from moving radially inward toward the disk. The independent platforms may act as dampers. Each platform is loosely held between the two turbine blades and able to move relative to the turbine blades and may, thus, function similar to an under-platform damper on a metallic blade.

The gas turbine engine 10 is designed to include the turbine wheel 20 and includes a fan 12, a compressor 14, a combustor 16, and a turbine 18 as shown in FIG. 1. The compressor 14 compresses and delivers air to the combustor 16. The combustor 16 mixes fuel with the compressed air received from the compressor 14 and ignites the fuel. The hot, high-pressure gasses from the burning fuel are directed into the turbine 18 where the turbine blades 24 of the turbine 18 extract work to drive the compressor 14 and the fan 12. In other embodiments, the gas turbine engine 10 may include a shaft, turboprop, or gearbox in place of fan 12.

In the illustrative embodiment, the turbine 18 includes a plurality of the turbine wheels 20 and a turbine shroud 25 arranged around the turbine wheels 20 as suggested in FIGS. 1-3. Each turbine wheel 20 includes the disk 22 and the plurality of turbine blades 24 as shown in FIG. 4. The disk 22 is arranged to rotate about the central axis 11 during operation of the gas turbine engine 10 and may be coupled to a shaft of the gas turbine engine 10 for transmitting the rotational power to the compressor 14 or fan 12. The plurality of turbine blades 24 extend radially away from the disk 22 and interact with the hot combustion gasses to rotate the disk 22 about the central axis 11. The turbine shroud 25 is arranged around the turbine blades 24 to block the hot, high pressure gasses from flowing over tips of the turbine blades 24 because work is not extracted from gasses that flow over the turbine blades 24.

The disk 22 includes a forward side 32, an aft side 34 spaced apart axially from the forward side 32, and an outer diameter 36 that extends between the forward side 32 and the aft side 34 as suggested in FIGS. 3 and 4. The disk 22 is formed to include a plurality of slots 38 that extend through the disk 22 in a generally axial direction from the forward side 32 to the aft side 34 of the disk 22 and inwardly in a radial direction from the outer diameter 36 of the disk toward the central axis 11. The slots 38 are dovetail shaped in the illustrative embodiment. In other embodiments, the slots 38 may be fir tree shaped or any other suitable shape. The disk comprises metallic material in the illustrative embodiments.

The plurality of turbine blades 24 includes a first turbine blade 27 and a neighboring second turbine blade 29 as shown in FIG. 4. The first turbine blade 27 is located in a first slot 40 included in the plurality of slots 38 formed in the disk 22 and the second turbine blade 29 is located in a second slot 42 included in the plurality of slots 38 formed in the disk 22. The first and second turbine blades 27, 29 are substantially similar to one another.

Each of the plurality of turbine blades 24 includes the root 26, the airfoil 28 coupled to the root 26, the platform 30, and the retainer shoulder 54 as shown, for example, in FIG. 4. The root 26 is located in one of the slots 38 formed in the disk 22 to couple the turbine blade 24 with the disk 22 for movement with the disk 22. The airfoil 28 extends radially outward away from the root 26 and is adapted to interact with the hot combustion gasses. The platform 30 extends circumferentially in a single direction from the airfoil 28 to a neighboring turbine blade 24 to discourage the hot gasses interacting with the airfoil 28 from moving radially inward toward the disk 22. The retainer shoulder 54 extends in an opposite direction of the platform 30 to block movement of a neighboring turbine blade 24. In the illustrative embodiment, the root 26, the airfoil 28, the platform 30, and the retainer shoulder are integrally formed to provide a single integral component.

The airfoil 28 includes a leading edge 46 and a trailing edge 48 spaced apart axially from the leading edge 46 relative to the central axis 11 as shown in FIG. 3. The airfoil 28 further includes a pressure side 50 and a suction side 52 spaced apart circumferentially from the pressure side 50 as shown in FIG. 4. The pressure side 50 and the suction side 52 extend axially between and interconnect the leading edge 46 and the trailing edge 48.

Figure 5:
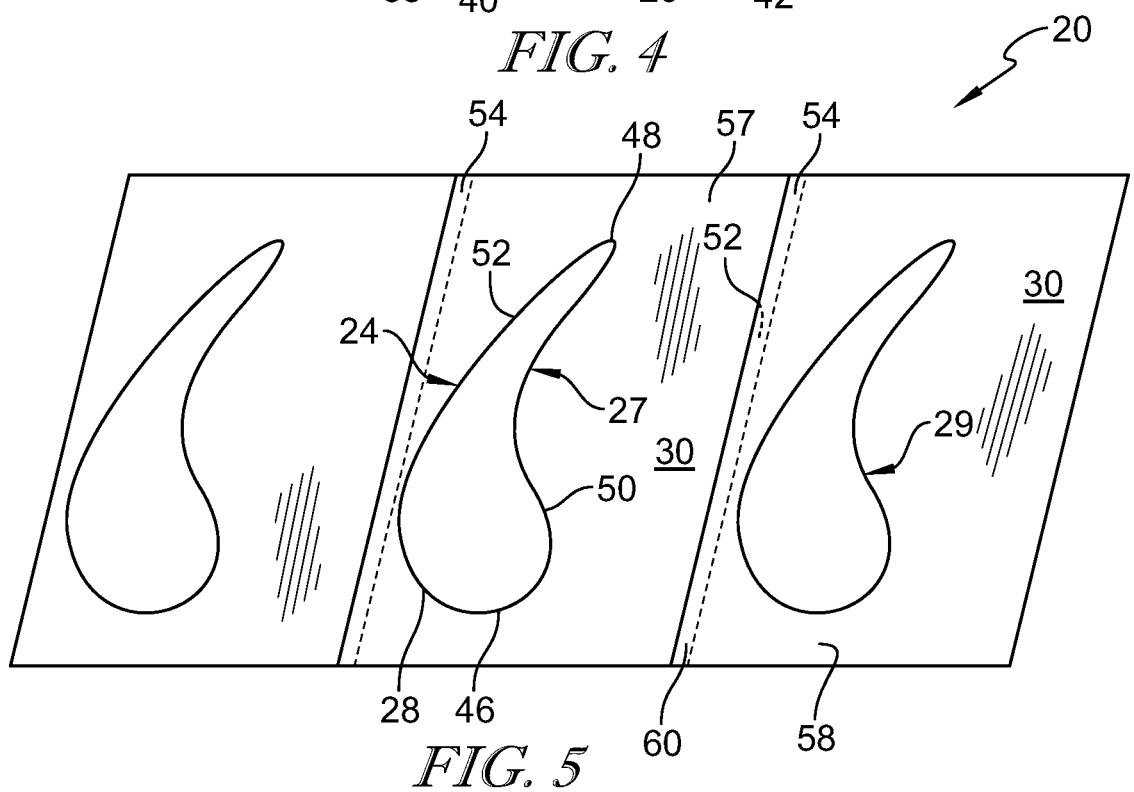
FIG. 5 is view of the turbine wheel of FIG. 4 looking radially inward toward a central axis of the turbine wheel and showing that the platform of each blade extends generally to the neighboring platform and suggesting that the retainer shoulder of the neighboring blade overlaps a portion of the platform.

Each platform 30 is located radially between the root 26 and the airfoil 28 as shown in FIG. 4. The platform 30 extends circumferentially in a single direction from the airfoil 28 of the first turbine blade 27, for example, to the neighboring second turbine blade 29 as shown in FIGS. 4 and 5. The platform 30 of the first turbine blade 27 extends circumferentially to the root 26 of the second turbine blade 29 in the illustrative embodiment.

Each platform 30 includes a partition member 51 and a radial lip 52 that extends circumferentially away from the partition member 51 toward the second turbine blade 29 as shown in FIG. 4. The partition member 51 has a generally uniform thickness. The radial lip 52 is a radially-inner lip 52 in the embodiment shown in FIG. 4 and extends from a radially inward portion of the partition member 51 to form a radially outward space to receive the retainer shoulder 54 of a neighboring turbine blade 24.

The retainer shoulder 54 extends circumferentially in a single direction opposite the platform 30 from the airfoil 28 as shown in FIG. 4. The retainer shoulder 54 interlocks with the platform 30 of a neighboring turbine blade 24 to block radial movement of the platform 30 and, thus, block rotating movement of the turbine blade 24.

As shown in FIGS. 4 and 5, the retainer shoulder 54 included in the second turbine blade 29 is aligned circumferentially with the radially-inner lip 52 included in the platform 30 of the first turbine blade 27. The retainer shoulder 54 included in the second turbine blade 29 is spaced apart from the disk 22 to locate the radially-inner lip 52 included in the platform 30 of the first turbine blade 27 between the disk 22 and the retainer shoulder 54 as shown in FIG. 5.

The platform 30 includes a radial outer surface 58 and the retainer shoulder 54 includes a radial outer surface 60 as shown in FIG. 4. The radial outer surface 58 of the platform 30 of the first turbine blade 27 is coradial with the radial outer surface 60 of the retainer shoulder 54 of the second turbine blade 29. That is, they both lie on the same arc having a constant radius. The platform 30 is spaced apart from the disk 22 to form an airgap 64 between the platform 30 and the disk 22. Pressurized cooling air may be conducted into the airgap 64 to cool the platform 30 and the disk 22.

The platform 30 is at least twice as long as the retainer shoulder 54 in the circumferential direction in some embodiments. The platform 30 is at least three times as long as the retainer shoulder 54 in the circumferential direction in some embodiments. The platform 30 is at least four times as long as the retainer shoulder 54 in the circumferential direction in some embodiments. The platform 30 is at least five times as long as the retainer shoulder 54 in the circumferential direction in some embodiments.

In illustrative embodiments, the turbine blades 24 comprise ceramic materials adapted to withstand the high temperature combustion gasses surrounding the turbine blades 24. In some embodiments, the turbine blades 24 are formed from metallic materials. In some embodiments, the blades are made from a metallic super alloy, ceramic matrix composite, or a monolithic ceramic.

Figure 6:
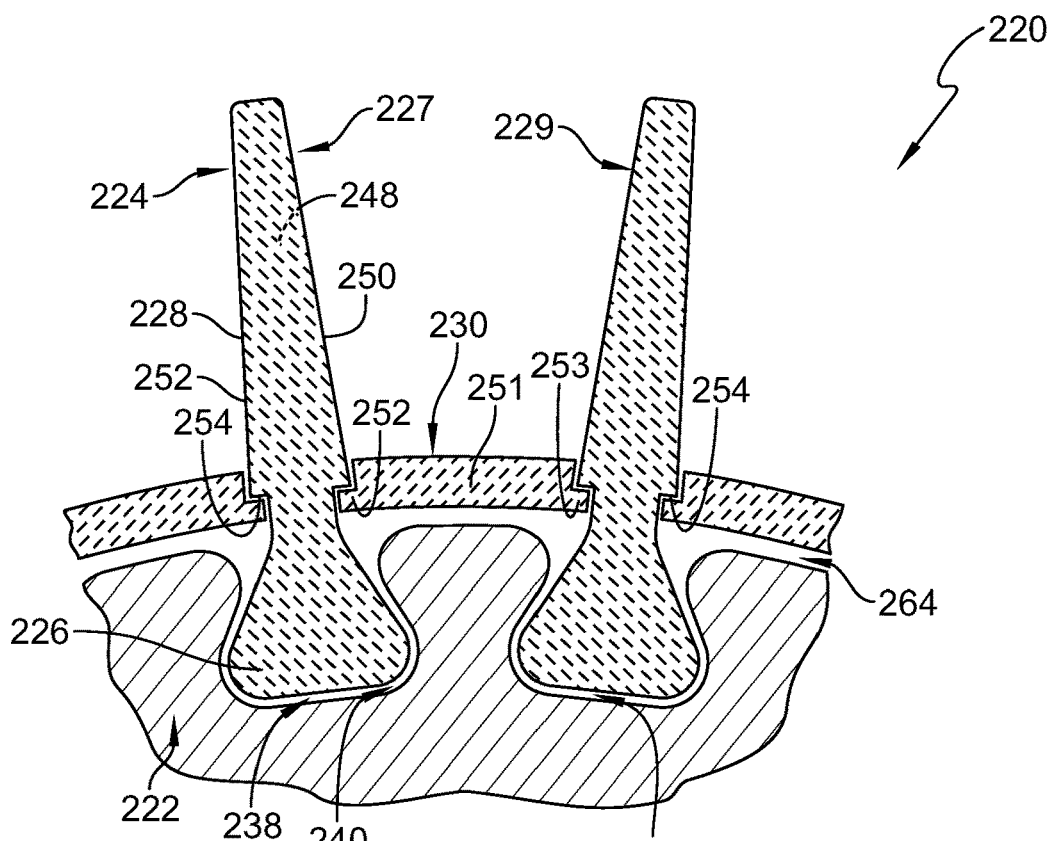
FIG. 6 is a section view of a turbine wheel for use with the gas turbine engine of FIG. 1 showing that the turbine wheel includes a disk, a plurality of blades coupled with the disk, and a plurality of platforms that are independent of the blades and further showing that each blade is formed to include a retainer shoulder arranged to define a radial inner surface of an airfoil of the blade and the retainer shoulder is arranged to block radial movement of the platforms.

Another embodiment of a turbine wheel 220 in accordance with the present disclosure is shown in FIG. 6. The turbine wheel 220 includes a disk 222, a plurality of turbine blades 224, and a plurality of platforms 230 that are independent of the turbine blades 224. As such, the platforms 230 may move relative to the turbine blades 224 and provide dampening effects. The turbine blades 224 and platform 230 comprise ceramic material, but are formed separately and are not substantially co-infiltrated with matrix materials in illustrative embodiments. The disk 222 is substantially similar to the disk 22 shown in FIG. 4.

The plurality of turbine blades 224 includes a first turbine blade 227 and a neighboring second turbine blade 229 as shown in FIG. 6. The first turbine blade 227 is located in a first slot 240 included in a plurality of slots 238 formed in the disk 222 and the second turbine blade 229 is located in a second slot 242 included in the plurality of slots 238. The first and second turbine blades 227, 229 are substantially similar to one another.

Each of the plurality of turbine blades 224 includes a root 226 and an airfoil 228 coupled to the root 226 as shown in FIG. 6. The root 226 is located in one of the slots 238 formed in the disk 222 to couple the turbine blade 224 with the disk 222 for movement with the disk 222. The airfoil 228 extends radially outward away from the root 226 and is adapted to interact with the hot combustion gasses. In the illustrative embodiment, the root 226 and the airfoil 228 are integrally formed to provide a single integral component.

The airfoil 228 includes a leading edge and a trailing edge 248 spaced apart axially from the leading edge relative to the central axis 11 as shown in FIG. 6. The airfoil 228 further includes a pressure side 250 and a suction side 252 spaced apart circumferentially from the pressure side 250. The pressure side 250 and the suction side 252 extend axially between and interconnect the leading edge and the trailing edge 248.

Each turbine blade 224 is formed to include a retainer shoulder 254 that has a surface that faces radially inward toward the root 226 as shown in FIG. 6. The retainer shoulder 254 may comprise a single planar surface. The retainer shoulder 254 interconnects directly the pressure side 250 and the root 226 and the suction side 252 and the root 226. In some embodiments, the retainer shoulder 254 extends entirely around the airfoil 228. In some embodiments, the retainer shoulder 254 extends partway around or on either side of the airfoil 228. The retainer shoulder 254 is bounded by a footprint of the airfoil 228 when viewing the turbine blade 224 radially inward toward the central axis 11. No portion of the retainer shoulder 254 extends circumferentially or axially beyond the airfoil 228.

Each platform 230 is located between neighboring turbine blades 224 to discourage the hot gasses interacting with the airfoils 228 from moving radially inward toward the disk 222 as shown in FIG. 6. The retainer shoulders 254 are configured to block radially outward movement of the platforms 230. The interface between the retainer shoulder 254 and the platform 230 may provide a sealing effect between the platform 230 and the retainer shoulder 254.

During operation of the turbine wheel 220, the platforms 230 are spaced apart from the disk 222 to form an airgap 264 between each of the platforms 230 and the disk 222. Pressurized cooling air may be conducted into the airgap 264 to cool the platform 230 and disk 222.

Each platform 230 includes a partition member 251, a first radial lip 252 that extends circumferentially away from the partition member 251 toward the first turbine blade 227, and a second radial lip 253 that extends circumferentially away from the partition member 251 toward the second turbine blade 229 as shown in FIG. 6. The partition member 251 has a generally uniform thickness.

The first radial lip 252 is a radially-inner lip 252 in the embodiment shown in FIG. 6 and extends from a radially inward portion of the partition member 251 to form a radially outward space to receive the retainer shoulder 254 of turbine blade 224. The second radial lip 253 is a radially-inner lip 253 in the embodiment shown in FIG. 6 and extends from a radially inward portion of the partition member 251 to form a radially outward space to receive the retainer shoulder 254 of another turbine blade 224.

Figure 7:
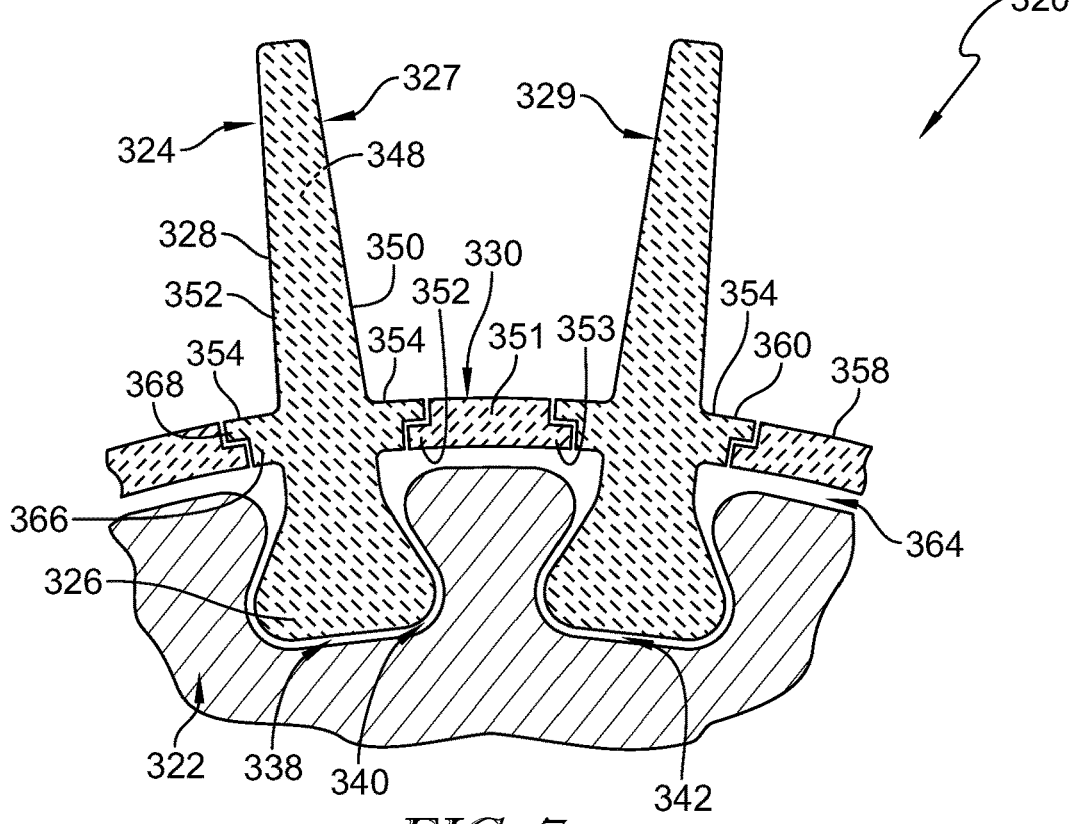
FIG. 7 is a section view of a turbine wheel for use with the gas turbine engine of FIG. 1 showing that the turbine wheel includes a disk, a plurality of blades coupled with the disk, and a plurality of platforms that are independent of the blades and each blade is formed to include a retainer shoulder arranged to extend away from an airfoil of the blade and adapted to block radial movement of the platforms.

Another embodiment of a turbine wheel 320 in accordance with the present disclosure is shown in FIG. 7. The turbine wheel 320 is substantially similar to the turbine wheel 220 shown in FIG. 6 and described herein. Accordingly, similar reference numbers in the 300 series indicate features that are common between the turbine wheel 220 and the turbine wheel 320. The description of the turbine wheel 220 is incorporated by reference to apply to the turbine wheel 320, except in instances when it conflicts with the specific description and the drawings of the turbine wheel 320.

The turbine wheel 320 includes a disk 322, a plurality of turbine blades 324, and a plurality of platforms 330 that are independent of the turbine blades 324. As such, the platforms 330 may move relative to the turbine blades 324 and provide dampening effects. The turbine blades 324 and platform 330 comprise ceramic material, but are formed separately and are not substantially co-infiltrated with matrix materials in illustrative embodiments. The disk 322 is substantially similar to the disk 22 shown in FIG. 4.

The plurality of turbine blades 324 includes a first turbine blade 327 and a neighboring second turbine blade 329 as shown in FIG. 7. The first turbine blade 327 is located in a first slot 340 included in a plurality of slots 338 formed in the disk 322 and the second turbine blade 329 is located in a second slot 342 included in the plurality of slots 338. The first and second turbine blades 327, 329 are substantially similar to one another.

Each of the plurality of turbine blades 324 includes a root 326, an airfoil 328 coupled to the root 326, and a retainer shoulder 354 that extends away from the airfoil 328 as shown in FIG. 7. The root 326 is located in one of the slots 338 formed in the disk 322 to couple the turbine blade 324 with the disk 322 for movement with the disk 322. The airfoil 328 extends radially outward away from the root 326 and is adapted to interact with the hot combustion gasses. The retainer shoulder 354 blocks radially outward movement of the platforms 330 during operation of the turbine wheel 320. In the illustrative embodiment, the root 326, the airfoil 328, and the retainer shoulder 354 are integrally formed to provide a single integral component.

The airfoil 328 includes a leading edge and a trailing edge 348 spaced apart axially from the leading edge relative to the central axis 11 as shown in FIG. 7. The airfoil 328 further includes a pressure side 350 and a suction side 352 spaced apart circumferentially from the pressure side 350. The pressure side 350 and the suction side 352 extend axially between and interconnect the leading edge and the trailing edge 348.

The retainer shoulder 354 includes a base 366 and a flange 368 that extends outwardly away from the base 366 as shown in FIG. 7. The base 366 and flange 368 extend around the entire airfoil 328 in the illustrative embodiment. The flange 368 is coupled to an outer radial end of the base 366 to form an opening at the radially inner end to receive a portion of the platform 330.

Each platform 330 is located between neighboring turbine blades 324 to discourage the hot gasses interacting with the airfoils 328 from moving radially inward toward the disk 322 as shown in FIG. 7. The retainer shoulders 354 are configured to block radially outward movement of the platforms 330. The interface between the retainer shoulder 354 and the platform 330 may provide a sealing effect between the platform 330 and the retainer shoulder 354.

During operation of the turbine wheel 320, the platforms 330 are spaced apart from the disk 322 to form an airgap 364 between each of the platforms 330 and the disk 322. Pressurized cooling air may be conducted into the airgap 364 to cool the platform 330 and the disk 322.

Each platform 330 includes a partition member 351, a first radial lip 352 that extends circumferentially away from the partition member 351 toward the first turbine blade 327, and a second radial lip 353 that extends circumferentially away from the partition member 351 toward the second turbine blade 329 as shown in FIG. 7. The partition member 351 has a generally uniform thickness. The first radial lip 352 is a radially-inner lip 352 in the embodiment shown in FIG. 7 and extends from a radially inward portion of the partition member 351 to form a radially outward space to receive the retainer shoulder 354 of turbine blade 324. The second radial lip 353 is a radially-inner lip 353 and extends from a radially inward portion of the partition member 351 to form a radially outward space to receive the retainer shoulder 354 of another turbine blade 324.

The platform 330 includes a radial outer surface 358 and the retainer shoulder 354 includes a radial outer surface 360 as shown in FIG. 7. The radial outer surface 358 of the platform 330 is coradial with the radial outer surface 360 of the retainer shoulder 354.

Figure 8:
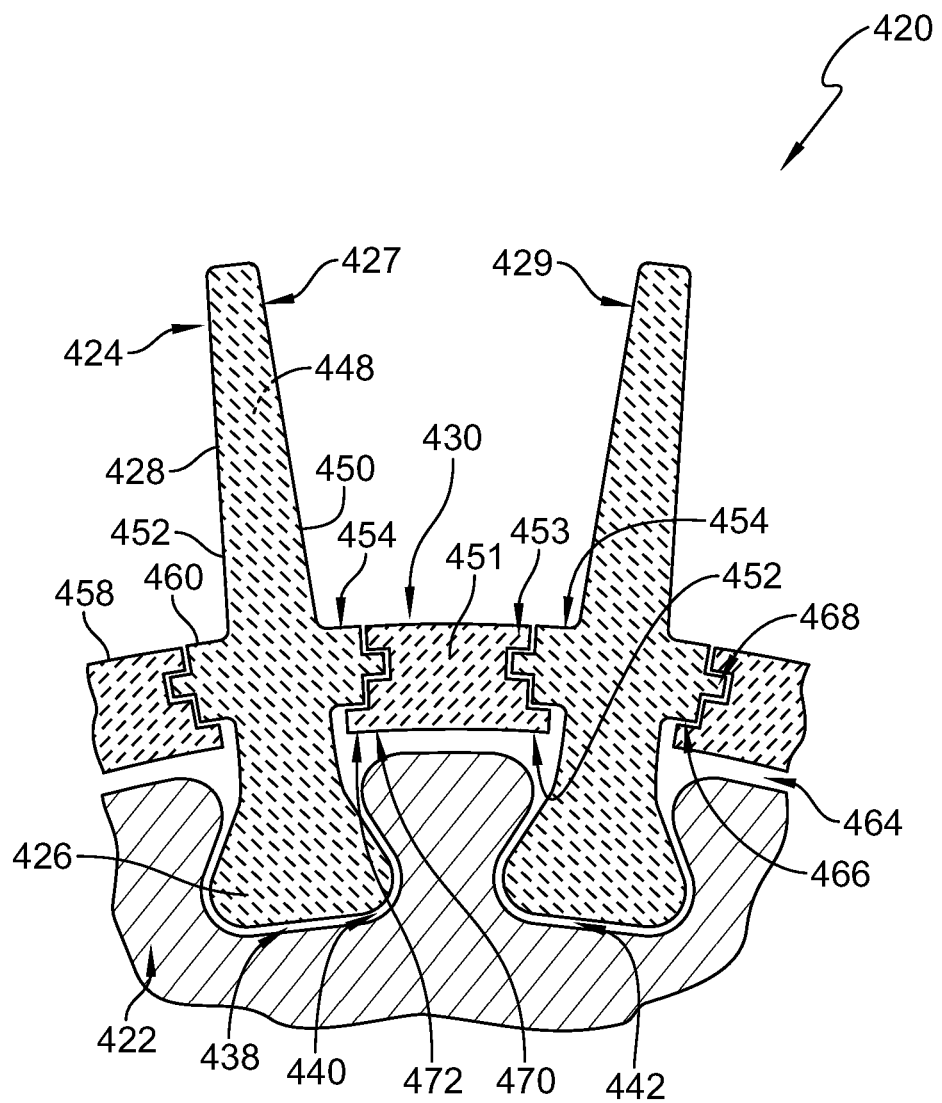
FIG. 8 is a section view of a turbine wheel for use with the gas turbine engine of FIG. 1 showing that the turbine wheel includes a disk, a plurality of blades coupled with the disk, and a plurality of platforms that are independent of the blades and each blade is formed to include a retainer shoulder arranged to extend away from an airfoil of the blade and adapted to block radial movement of the platforms.

Another embodiment of a turbine wheel 420 in accordance with the present disclosure is shown in FIG. 8. The turbine wheel 420 is substantially similar to the turbine wheel 320 shown in FIG. 7 and described herein. Accordingly, similar reference numbers in the 400 series indicate features that are common between the turbine wheel 320 and the turbine wheel 420. The description of the turbine wheel 320 is incorporated by reference to apply to the turbine wheel 420, except in instances when it conflicts with the specific description and the drawings of the turbine wheel 420.

The turbine wheel 420 includes a disk 422, a plurality of turbine blades 424, and a plurality of platforms 430 that are independent of the turbine blades 424. As such, the platforms 430 may move relative to the turbine blades 424 and provide dampening effects. The turbine blades 424 and platform 430 comprise ceramic material, but are formed separately and are not substantially co-infiltrated with matrix materials in illustrative embodiments. The disk 422 is substantially similar to the disk 22 shown in FIG. 4.

The plurality of turbine blades 424 includes a first turbine blade 427 and a neighboring second turbine blade 429 as shown in FIG. 8. The first turbine blade 427 is located in a first slot 440 included in a plurality of slots 438 formed in the disk 422 and the second turbine blade 429 is located in a second slot 442 included in the plurality of slots 438. The first and second turbine blades 427, 429 are substantially similar to one another.

Each of the plurality of turbine blades 424 includes a root 426, an airfoil 428 coupled to the root 426, and a retainer shoulder 454 that extends away from the airfoil 428 as shown in FIG. 8. The root 426 is located in one of the slots 438 formed in the disk 422 to couple the turbine blade 424 with the disk 422 for movement with the disk 422. The airfoil 428 extends radially outward away from the root 426 and is adapted to interact with the hot combustion gasses. The retainer shoulder 454 blocks radially outward movement of the platforms 430 during operation of the turbine wheel 420. In the illustrative embodiment, the root 426, the airfoil 428, and the retainer shoulder 454 are integrally formed to provide a single integral component.

The airfoil 428 includes a leading edge and a trailing edge 448 spaced apart axially from the leading edge relative to the central axis 11 as shown in FIG. 8. The airfoil 428 further includes a pressure side 450 and a suction side 452 spaced apart circumferentially from the pressure side 450. The pressure side 450 and the suction side 452 extend axially between and interconnect the leading edge and the trailing edge 448.

The retainer shoulder 454 includes a base 466 and a flange 468 that extends outwardly away from the base 466 as shown in FIG. 8. The flange 468 extends on the pressure side and suction side of the airfoil 428 in the illustrative embodiment. In other embodiments, the base 466 and flange 468 extend around the entire airfoil 428.

Each platform 430 is located between neighboring turbine blades 424 to discourage the hot gasses interacting with the airfoils 428 from moving radially inward toward the disk 422 as suggested in FIG. 8. The retainer shoulders 454 are configured to block radially outward movement of the platforms 430. The interface between the retainer shoulder 454 and the platform 430 may provide a sealing effect between the platform 430 and the retainer shoulder 454.

During operation of the turbine wheel 420, the platforms 430 are spaced apart from the disk 422 to form an airgap 464 between each of the platforms 430 and the disk 422. Pressurized cooling air may be conducted into the airgap 464 to cool the platform 430 and the disk 422.

Each platform 430 includes a partition member 451, a first pair of radial lips 452 that extends circumferentially away from the partition member 451, and a second pair of radial lips 453 that extends circumferentially away from the partition member 451 as shown in FIG. 8. The partition member 451 has a generally uniform thickness. The first pair of radial lips 452 includes radially-inner lips 452 and extends from a radially inward portion of the partition member 451. The second pair of radial lips 453 include radially-outer lips 453 that extend from a radially outward portion of the partition member 451 as shown in FIG. 8

The radially-inner lips 452 are spaced apart radially from the radially-outer lips 453 to form openings that receive the platforms 430. The radially-inner lips 452 extends circumferentially further than the radially-outer lips 453. The radially-inner lips 452 include first shelves 470 that extend circumferentially about as far as the radially-outer lips 453 and second shelves 472 that extend circumferentially further than the first shelves and radially-outer lips 453.

The platforms 430 each include a radial outer surface 458 and the retainer shoulder 454 includes a radial outer surface 460 as shown in FIG. 8. The radial outer surface 458 of the platform 430 is coradial with the radial outer surface 460 of the retainer shoulder 454.

Figure 9:
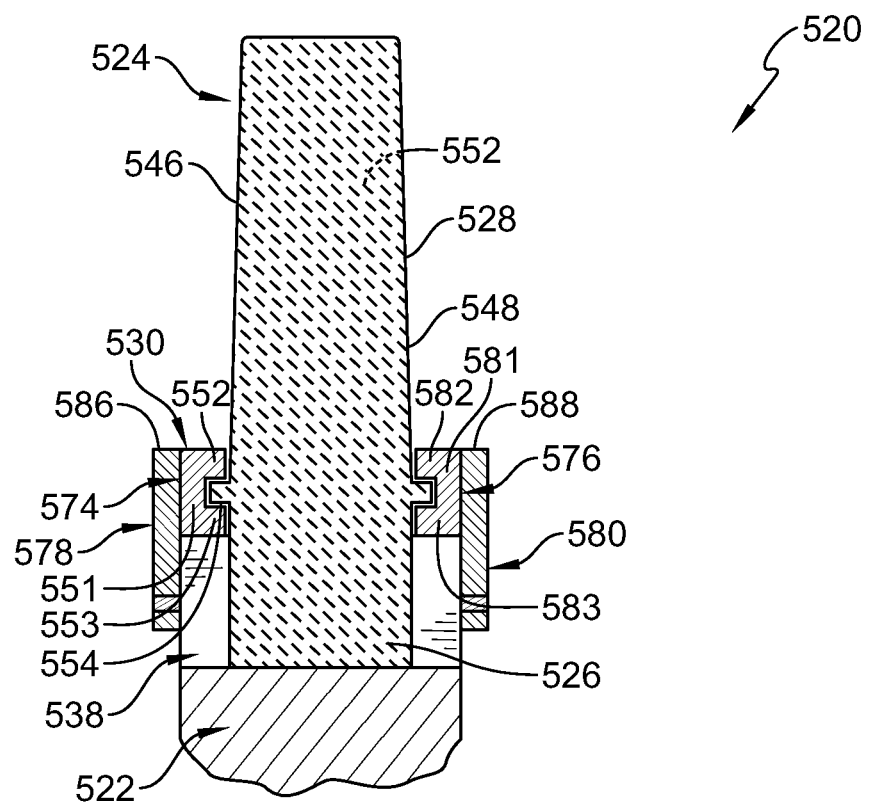
FIG. 9 is a section view of a turbine wheel for use with the gas turbine engine of FIG. 1 showing that the turbine wheel includes a disk, a blade coupled with the disk, and a platform having a fore platform segment and an aft platform segment that are each independent of the blade and adapted to extend around a portion of the blade.
Figure 10:
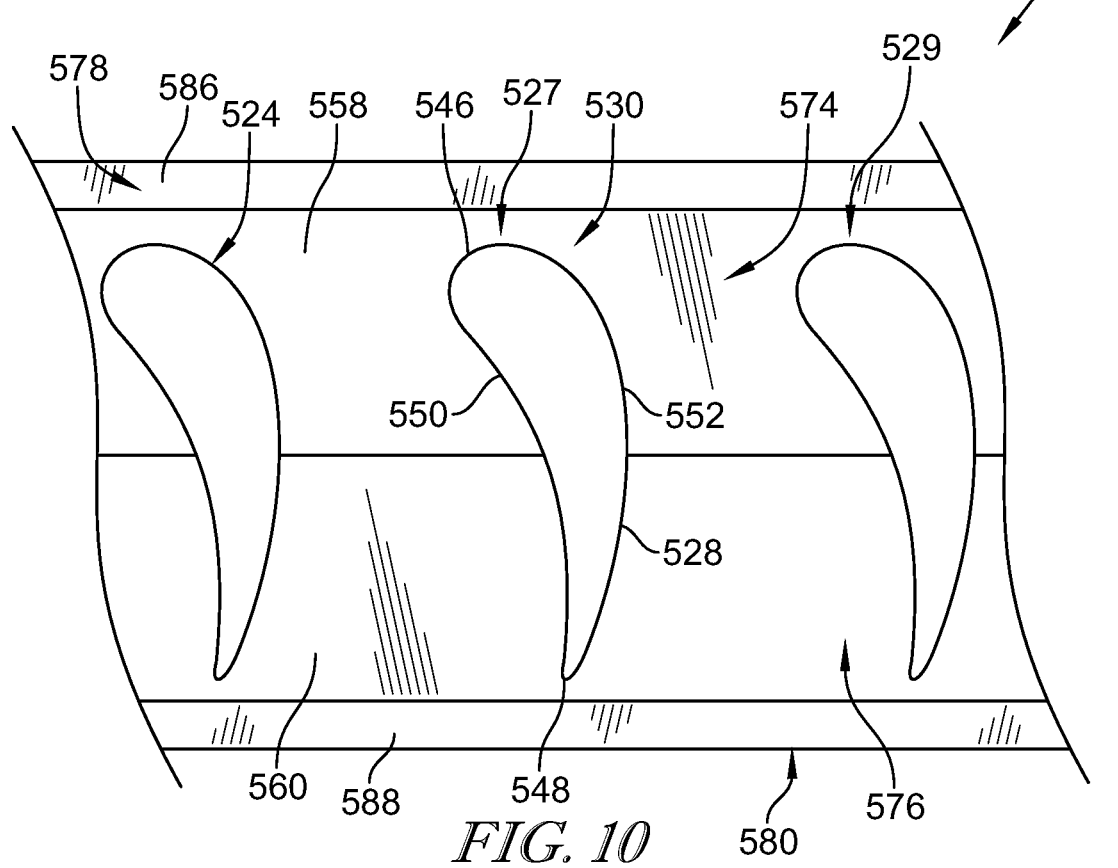
FIG. 10 is view of the turbine wheel of FIG. 9 looking radially inward toward a central axis of the turbine wheel and suggesting that the fore and aft platform segments are continuous full hoop components and extend around a portion of a plurality of blades and that retention bands are positioned adjacent the disk to block axial movement of the blades and the platform segments.

Another embodiment of a turbine wheel 520 in accordance with the present disclosure is shown in FIGS. 9 and 10. The turbine wheel 520 includes a disk 522, a plurality of turbine blades 524, and a platform 530 that is independent of the turbine blades 524. As such, the platform 530 may move relative to the turbine blades 524 and provide dampening effects. The turbine blades 524 and platform 530 comprise ceramic material, but are formed separately and are not substantially co-infiltrated with matrix materials in illustrative embodiments. The disk 522 is substantially similar to the disk 22 shown in FIG. 4. The turbine wheel 520 optionally includes a fore retention band 578 and an aft retention band 580.

The plurality of turbine blades 524 includes a first turbine blade 527 and a neighboring second turbine blade 529 as shown in FIG. 10. The first turbine blade 527 is located in a first slot included in a plurality of slots 538 formed in the disk 522 and the second turbine blade 529 is located in a second slot included in the plurality of slots 538. The first and second turbine blades 527, 529 are substantially similar to one another.

Each of the plurality of turbine blades 524 includes a root 526, an airfoil 528 coupled to the root 526, and a retainer shoulder 554 that extends away from the airfoil 528 as shown in FIG. 9. The root 526 is located in one of the slots 538 formed in the disk 522 to couple the turbine blade 524 with the disk 522 for movement with the disk 522. The airfoil 528 extends radially outward away from the root 526 and is adapted to interact with the hot combustion gasses. The retainer shoulder 554 blocks radially movement of the platform 530 during operation of the turbine wheel 520. In the illustrative embodiment, the root 526, the airfoil 528, and the retainer shoulder 554 are integrally formed to provide a single integral component.

The airfoil 528 includes a leading edge 546 and a trailing edge 548 spaced apart axially from the leading edge 546 relative to the central axis 11 as shown in FIG. 10. The airfoil 528 further includes a pressure side 550 and a suction side 552 spaced apart circumferentially from the pressure side 550. The pressure side 550 and the suction side 552 extend axially between and interconnect the leading edge 546 and the trailing edge 548.

The retainer shoulder 554 interlocks with the platform 530 to block radial movement of the platform 530 as shown in FIG. 9. The retainer shoulder 554 extends circumferentially and axially away from the airfoil 528 as shown in FIG. 9. As such, the retainer shoulder 554 extends away from the leading edge 546, the trailing edge 548, the pressure side 550, and the suction side 552 of the airfoil. In other embodiments, the retainer shoulder 554 extends axially fore and aft, but not circumferentially.

The retainer shoulder 554 is configured to block radial movement of the platform 530. The interface between the retainer shoulder 554 and the platform 530 may provide a sealing effect between the platform 530 and the retainer shoulder 554.

The platform 530 is located around the turbine blades 424 to discourage the hot gasses interacting with the airfoils 528 from moving radially inward toward the disk 522 as suggested in FIGS. 9 and 10. The platform 530 may be spaced apart from the disk 522 in some embodiments to form an airgap between the platform 530 and the disk 522. Pressurized cooling air may be conducted into the airgap to cool the platform 530 and the disk 522.

The platform 530 includes a fore platform segment 574 and an aft platform segment 576. The fore platform segment 574 extends around a portion of the plurality of turbine blades 524. The aft platform segment 576 extends around another portion of the plurality of turbine blades 524 so that the turbine blades 524 are located axially between the fore and aft platform segments 576, 576. The fore platform segment 574 and the aft platform segment 576 cooperate to extend around the airfoils 528 of the turbine blades 524 entirely.

The fore platform segment 574 extends around the leading edge 546, the pressure side, and the suction side 552 of each of the plurality of turbine blades 224. The fore platform segment 574 is independent of the turbine blades 524 and the aft platform segment 576. The fore platform segment 574 is formed as a continuous, full hoop that extends around the central axis 11 in the illustrative embodiment. In other embodiments, the fore platform segment 574 extends partway about the central axis 11 and is configured to extend around one or more of the plurality of turbine blades 524.

The fore platform segment 574 includes a partition member 551, a first radial lip 552 that extends away from the partition member 551, and a second radial lip 553 that extends circumferentially away from the partition member 551 as shown in FIG. 9. The partition member 551 has a generally uniform thickness.

The first radial lip 552 is a radially-inner lip 552 and extends from a radially inward portion of the partition member 551. The second radial lip 553 is a radially-outer lip 553 that extends from a radially outward portion of the partition member 551 as shown in FIG. 9. The radially-outer lip 553 is spaced apart radially from the radially-inner lip 552 to define an opening that receives the retainer shoulder 554 included in the turbine blade 524 so that the retainer shoulder 554 is located radially between the radially-outer lip 553 and the radially-inner lip 552.

The aft platform segment 576 includes a partition member 581, a first radial lip 582 that extends away from the partition member 551, and a second radial lip 583 that extends circumferentially away from the partition member 581 as shown in FIG. 9. The partition member 581 has a generally uniform thickness.

The first radial lip 582 is a radially-inner lip 582 and extends from a radially inward portion of the partition member 581. The second radial lip 583 is a radially-outer lip 583 that extends from a radially outward portion of the partition member 581 as shown in FIG. 9. The radially-outer lip 583 is spaced apart radially from the radially-inner lip 582 to define an opening that receives the retainer shoulder 554 included in the turbine blade 524 so that the retainer shoulder 554 is located radially between the radially-outer lip 583 and the radially-inner lip 582.

The fore platform segment 574 includes a radial outer surface 558 and the aft platform segment 576 includes a radial outer surface 560 as shown in FIGS. 9 and 10. The radial outer surface 558 is coradial with the radial outer surface 560.

The fore retention band 578 is an annular, full-hoop retention band 578 as suggested in FIGS. 9 and 10. The fore retention band 578 is spaced apart axially from the turbine blades 524 to locate the fore platform segment 574 and the disk 522 axially between the annular, full-hoop fore retention band 578 and the turbine blades 524 to block axial movement of the fore platform segment 574. The fore retention band 578 has a radial height sufficient to engage the disk 522 and the fore platform segment 574 simultaneously. The fore retention band 578 has a radial outer surface 586 that is coradial with the radial outer surface 558 of the fore platform segment 574.

The aft retention band 580 is an annular, full-hoop retention band 580 as suggested in FIGS. 9 and 10. The aft retention band 580 is spaced apart axially from the turbine blades 524 to locate the aft platform segment 576 and the disk 522 axially between the annular, full-hoop aft retention band 580 and the turbine blades 524 to block axial movement of the aft platform segment 576. The aft retention band 580 has a radial height sufficient to engage the disk 522 and the aft platform segment 576 simultaneously. The aft retention band 580 has a radial outer surface 588 that is coradial with the radial outer surface 560 of the aft platform segment 576.

Ceramic matrix composite (CMC) materials may sustain higher temperatures than traditional metal alloys. As a result, it may be desirable to use ceramic matrix composite materials in gas turbine engines where higher fuel efficiencies may be reached with higher temperatures. The turbine section of the engine may experience high temperatures and ceramic matrix composite materials may provide a benefit in that area.

In accordance with this disclosure, it may be desirable to vary a length of the platform portion or remove the platform portion from the blade when using ceramic matrix composite material blades to ease manufacturing issues. The present disclosure provides several embodiments of platforms that are supported by a ceramic matrix composite blade but the platform is separate from the blade itself. Other embodiments include platforms that are integral with the blade but extend in only one circumferential direction.

In some embodiments, the blade is designed with a ledge around the airfoil that retains the platform radially as shown in FIG. 6. This ledge can be formed with additional plies of ceramic matrix composite materials on an outer surface of the airfoil or by having additional plies inside of an outer wrap that form the desired shape. The platform may be made from a metallic super alloy, ceramic matrix composite, or a monolithic ceramic.

In another embodiment, a "stub" platform is formed on the blade as shown in FIGS. 7 and 8. This stub platform may contain features that retain the platform radially. The stub platform may only extend out to the sides of the blade (not forward or aft) in some embodiments and that the retained platform may form the forward and aft flowpath regions. In other embodiments, the stub platform may only extend forward and aft. Embodiments that provide a sealing feature, such as the one as shown in FIG. 8, may reduce leakage between the platform and the blade.

One advantage of present disclosure may be that the platforms may act as dampers. As each platform is loosely held between the two blades, it is able to move and could thus function similar to an under-platform damper on a metallic blade.

Other embodiments, shown in FIGS. 4 and 5, include a platform and a retainer shoulder integrally formed into the ceramic matrix composite blade with the platform length extending from the airfoil in an opposing circumferential directions and different length than the retainer shoulder. The longer length side is supported by the adjacent blade to minimize excessive bending into the flow path. One functional advantage of this configuration may be that there is half the number of leakage paths since the platform is integral to the blade.

Another advantage of the embodiment shown in FIGS. 4 and 5 may be in the manufacturing process. For a ceramic matrix composite blade made from 2D ply fiber architecture, the outer airfoil plies may follow the curvature of the airfoil as well as transition into the platform geometry. This curvature can be complex and force a number of splices or darts in the fabric layers to fill the required volume. The splices and darts reduce the mechanical properties of the material in these regions. By biasing the split line in the platform toward one blade, it may simplify the layup process reducing or eliminating the need for splices and darts.

Another embodiment, shown in FIGS. 9 and 10, uses a two piece full-hoop platform. The platform may be sectioned about midway along the axial length of the blade/disc and may be secured axially using keeper plates on either side of the platform and steps on the outer edges of the blade.

Any of the embodiments may include a spring between the platform and disk post to hold the platform in place and keep it from falling away from attachment points. The spring may be made from any high temperature super alloy such as sheet metal or a ceramic spring.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A turbine wheel comprising
   a disk comprising metallic material and arranged around
     a central axis and formed to include slots that extend
     radially inward from an outer diameter of the disk
     toward the central axis, and a plurality of turbine blades comprising ceramic matrix composite materials, the plurality of turbine blades coupled to the disk and extends radially away from the outer diameter, the plurality of turbine blades include a first turbine blade shaped to provide an airfoil configured to interact with hot gasses passing around the plurality of turbine blades, a root received in one of the slots formed in the disk to couple the first turbine blade to the disk, and a platform that extends circumferentially in a single direction from the airfoil to discourage the hot gasses interacting with the airfoil from moving radially inward toward the disk wherein the first turbine blade further includes a retainer shoulder that extends circumferentially in a single direction opposite the platform from the airfoil and the retainer shoulder has a circumferential length that is less than a circumferential length of the platform.

2. The turbine wheel of claim 1, wherein the plurality of turbine blades includes a second turbine blade shaped to provide an airfoil, a root, and a platform that extends circumferentially in a single direction from the airfoil and the retainer shoulder included in the first turbine blade is configured to interlock with the platform included in the second turbine blade to block radial movement of the platform of the second turbine blade.

3. The turbine wheel of claim 2, wherein the platform included in the first turbine blade includes a partition member and a radially-inner lip that extends circumferentially away from the partition member and toward the second turbine blade.

4. The turbine wheel of claim 3, wherein the second turbine blade includes a retainer shoulder, the retainer shoulder included in the second turbine blade is aligned circumferentially with the radially-inner lip included in the platform of the first turbine blade, and the retainer shoulder included in the second turbine blade is spaced apart from the disk to locate the radially-inner lip included in the platform of the first turbine blade therebetween.

5. The turbine wheel of claim 1, wherein the circumferential length of the platform is at least twice as long as the circumferential length of the retainer shoulder.

6. The turbine wheel of claim 1, wherein the plurality of turbine blades includes a second turbine blade shaped to provide an airfoil, a root, a platform, and a retainer shoulder and the platform of the first turbine blade extends circumferentially to the root of the second turbine blade.

7. The turbine wheel of claim 1, wherein the plurality of turbine blades includes a second turbine blade shaped to provide an airfoil, a root, a platform, and a retainer shoulder and a radial outer surface of the retainer shoulder included in the second turbine blade and a radial outer surface of the platform included in the first turbine blade are coradial.

8. A turbine wheel comprising
   a disk comprising metallic material and arranged around a central axis and formed to include slots that extend radially inward from an outer diameter of the disk toward the central axis,
   a plurality of turbine blades comprising ceramic matrix composite materials, the plurality of turbine blades coupled to the disk and extend radially away from the outer diameter, the plurality of turbine blades include a first turbine blade shaped to provide an airfoil configured to interact with hot gasses passing around the plurality of turbine blades, a root received in one of the slots formed in the disk to couple the first turbine blade to the disk, and a first retainer shoulder that extends axially from the airfoil, and
   a first platform segment independent of the first turbine blade, the first platform segment interlocks with the first retainer shoulder and is arranged to extend around a portion of the first turbine blade to discourage the hot gasses interacting with the airfoil from moving radially inward toward the disk and includes a partition member, a radially-inner lip that extends axially away from the partition member, and a radially-outer lip that extends axially away from the partition member, and the first retainer shoulder is located radially between the radially-outer lip and the radially-inner lip
   wherein the first platform segment extends around a pressure side and a suction side of each of the plurality of turbine blades.

9. The turbine wheel of claim 8, further comprising an annular, full-hoop retention band spaced apart axially from the first turbine blade to locate the first platform segment and the disk axially between the annular, full-hoop retention band and the first turbine blade to block axial movement of the first platform segment.

10. The turbine wheel of claim 8, wherein the first platform segment is formed as a continuous, full hoop that extends around the central axis.

* * * * *